United States Patent [19]

Inaba et al.

[11] Patent Number: 4,465,424

[45] Date of Patent: Aug. 14, 1984

[54] INDUSTRIAL ROBOT

[75] Inventors: Hajimu Inaba; Seiichiro Nakashima, both of Hino; Shigemi Inagaki, Musashino; Susumu Ito, Hino, all of Japan

[73] Assignee: Fujitsu Fanuc Limited, Tokyo, Japan

[21] Appl. No.: 391,397

[22] Filed: Jun. 23, 1982

[30] Foreign Application Priority Data

Jun. 29, 1981 [JP] Japan ................................ 56/99739

[51] Int. Cl.³ ............................................ B25J 19/00
[52] U.S. Cl. ...................................... 414/589; 414/4; 414/749
[58] Field of Search ............... 414/589, 744 R, 744 A, 414/744 B, 744 C, 749-753, 730, 1-8; 60/372

[56] References Cited

U.S. PATENT DOCUMENTS 3,115,086 12/1963 Stimmel ........................... 60/372 X
4,024,959 5/1977 Gruner ................................. 414/751
4,289,441 9/1981 Inaba et al. ..................... 414/751 X Primary Examiner—Leslie J. Paperner
Assistant Examiner—Terrance L. Siemens
Attorney, Agent, or Firm—Armstrong, Nikaido, Marmelstein & Kubovcik

[57] ABSTRACT

An industrial robot, having a manipulative robot hand for mounted on a vertically movable portion thereof moved by a vertical drive, provided with a load reducing pneumatic cylinder for applying a constant upward force to the vertically movable portion during the vertical movement of the portion and an air storage tank or tanks directly connected to the pneumatic cylinder for continuously supplying air under a desired fixed pressure. The upward force contributes to reducing a load applied to the vertical drive. The air storage tank or tanks contributes to ensuring mechanical rigidity of the industrial robot.

3 Claims, 4 Drawing Figures

INDUSTRIAL ROBOT

DESCRIPTION OF THE INVENTION

The present invention relates to an industrial robot operating as an industrial manipulating device, more particularly to an industrial robot with an improved load reducing means capable of reducing the load applied to an actuator, for example, a feed motor, for driving the vertically movable portion of the robot.

Industrial robots are conventionally employed for, for example, numerically controlled machine tools, as industrial manipulating devices transferring workpieces to and from the machine tools or loading and unloading workpieces to and from the machine tools.

Industrial robots are equipped with manipulator robot hands capable of transverse expansion or contraction. The robots are also equipped with means for moving the robot hand vertically and means for rotating the robot hand in a horizontal plane, thereby enabling the robot hand to be brought to the desired position. For the purpose of vertical movement of the robot hand, the robots are structured with one or more guide pillars along which a portion of the body can be vertically moved by means of an actuator, for example, a feed motor. The above-mentioned robot hand is mounted on this vertically movable portion so as to be transversely expandable and contractable. Accordingly, it is necessary that the actuator have a considerably large drive power, enough for driving the vertical movement of that portion of the body while supporting the load of the workpiece gripped by the robot hand, the weight of the vertically movable portion and the robot hand, and the mechanical moment acting on the vertically movable portion.

It has already been proposed to provide industrial robots equipped with load reducing means to reduce the load applied to the actuator. One example of an industrial robot equipped with a load reducing means is disclosed in U.S. Pat. No. 4,289,441, granted on Sept. 15, 1981. The load reducing means comprises a cylinder means capable of applying, to the vertically movable portion, an upward force corresponding to the downward load acting on the actuator, thereby reducing the load applied to the actuator. This conventional load reducing means, however, is arranged to maintain the upward force given to the vertically movable portion at a continuously constant level by discharging the air, which had been compressed to a high pressure within the cylinder means during the downward movement of the vertically movable portion, out to the atmosphere by way of a relief valve.

Consequently, the energy used for operating the pressurized air source had been wasted by the discharge of pressurized air to the atmosphere. The discharge of pressurized air once used for the cylinder means into the atmosphere also often became a cause of environmental pollution due to its oil component as the air supplied to the cylinder means is usually mixed with a mineral oil.

Accordingly, demands have arisen for the above-mentioned disadvantages to be eliminated, i.e., for improvements to be made for greater energy savings and for prevention of environmental pollution.

SUMMARY OF THE INVENTION

An object of the present invention is to provide an industrial robot equipped with a load reducing means which meets the above-mentioned demands.

In accordance with the present invention, the industrial robot comprises a manipulative robot hand, a vertically movable portion supporting the robot hand thereon, a vertical drive means for effecting vertical movement of the vertically movable portion guided by a vertical guide pillar or pillars, the vertical drive means including a vertical feed motor, a pneumatic cylinder means for applying an upward force to the vertically movable portion, air storage means arranged between a pressurized air source and the pneumatic cylinder means for storing air under pressure therein, and air conduit means for providing a direct connection between the air storage means and the pneumatic cylinder means.

The arrangement wherein the pneumatic cylinder means and the air storage means are directly connected to effect continuous supply of pressurized air from the air storage means to the pneumatic cylinder means enables the use of a pressurized air source, i.e., an air compressor, with a supply capacity only large enough to replenish the air storage means at a supply rate corresponding to the leakage of air from the air storage means.

At this stage, it should be understood that in the conventional load reducing means of an industrial robot, pressurized air is supplied directly from an air source to a cylinder means for applying upward force to the vertically movable portion of the robot. After the pressurized air is discharged from the cylinder means to the atmosphere, the air source has to resupply pressurized air to the cylinder means. Accordingly, the successive operation of a large-capacity air source, such as an air compressor, is inevitable.

The present invention represents a considerable improvement in respect to energy savings.

Other objects, features, and advantages of the present invention will become apparent from the ensuring description of a preferred embodiment with reference to the accompanying drawings, wherein.

Figure 1:
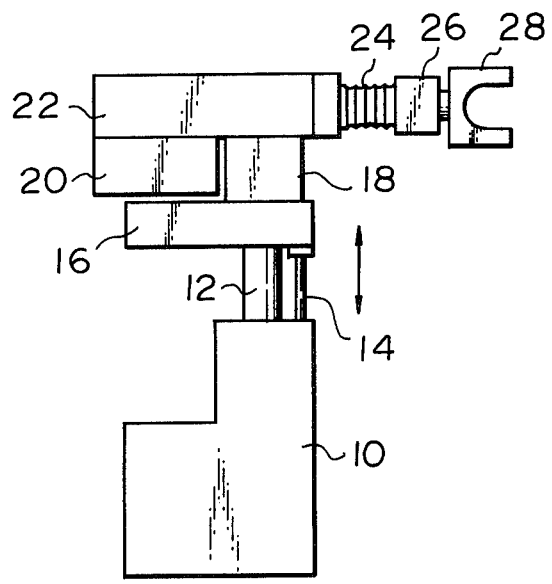
FIG. 1 is a front view of an industrial robot equipped with a conventional load reducing means.

Referring to FIG. 1, an industrial robot has the load reducing means described below. A base structure is designated by reference numeral 10. A vertical drive means including a vertical feed motor and a pneumatic cylinder are both built in the base structure 10. A vertical guide pillar 12 and a piston rod 14 of the pneumatic cylinder extend upright above the base structure 10. A vertically movable portion including a robot rotation means 16, a bearing box 18, a robot arm drive motor 20, a robot housing 22, a robot arm 24, a robot wrist 26, and a robot hand 28 is adapted to move up and down along the vertical guide pillar 12. The pneumatic cylinder of the above-mentioned load reducing means applies an upward force to the vertically movable portion by means of the piston rod 14.

Figure 2:
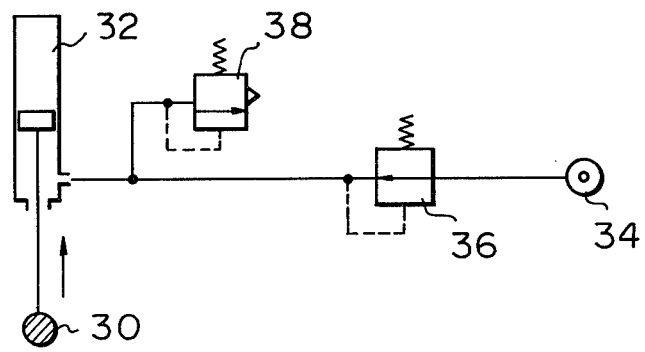
FIG. 2 is a pneumatic circuit arrangement of the conventional load reducing means.

Referring to FIG. 2, illustrating the pneumatic circuit arrangement of the conventional load reducing means of FIG. 1, the hatched circle referenced by number 30 represents the vertically movable portion of the robot illustrated in FIG. 1. The portion 30 is continuously subjected to an upward force by a pneumatic cylinder 32. The pneumatic cylinder 32 is supplied with air under pressure from a pressurized air source 34, such as an air compressor, by way of a pressure regulator 36 for regulating the air to a desired fixed pressure level. Therefore, the portion 30 is continuously subjected to a force equivalent to the product of the pressure set by the pressure regulator 36 and the effective area of the pneumatic cylinder 32. A relief valve 38 is provided for preventing an excessive rise in the pressure of the air resulting from the compression of the air within the pneumatic cylinder 32 while the portion 30 is moved down by a vertical drive means. That is, the relief valve 38 contributes to maintaining the fixed desired pressure level of the air by discharging the excessively compressed air therefrom into the atmosphere during the downward movement of the portion 30. However, the pressurized air source 34 must resupply pressurized air to compensate for the discharged air after the discharge operation of the relief valve 38. Thus, the pressurized air source 34 must be of a large capacity and must frequently be operated.

The present invention is able to provide a load reducing means which eliminates the disadvantages of the conventional means.

Figure 3:
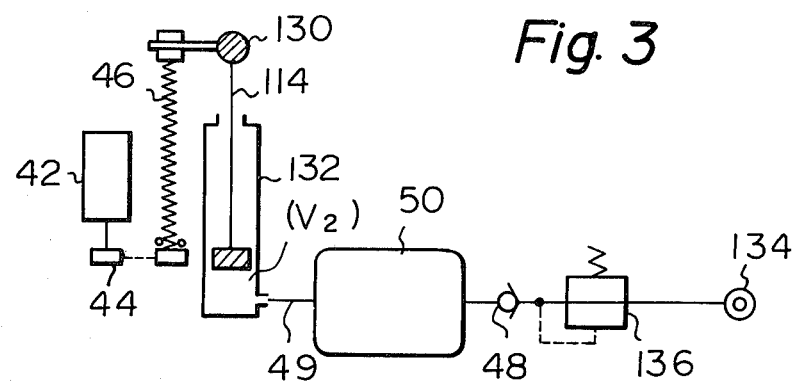
FIG. 3 is a pneumatic circuit arrangemnt of a load reducing means of an industrial robot, according to the present invention.

Referring now to FIG. 3, illustrating the pneumatic circuit arrangement of an industrial-robot load reducing means embodying the present invention, the hatched circle referenced by number 130 illustrates the vertically movable portion of the robot. A feed motor 42, a belt-and-pulley mechanism 44, and a feed screw mechanism 46, which are constituent elements of a vertical drive means for the portion 130, are also schematically illustrated in FIG. 3.

In the present invention, pressurized air produced by the pressurized air source 134 is sent into an air storage tank 50 by way of a pressure regulator 136 and a check valve 48. The air storage tank 50 stores air under a desired fixed pressure. The air under the desired fixed pressure of the air storage tank 50 is supplied to the pneumatic cylinder 132 by way a conduit 49, so that an upward force corresponding to the product of the pressure of the air and the effective area of the pneumatic cylinder 132 is applied by the piston rod 114 of the cylinder 13 to the portion 130. The air storage tank 50 has a sufficient storage capacity. With the pneumatic circuit arrangement of FIG. 3, pressurized air can always be supplied from the air storage tank 50 to the pneumatic cylinder 132 once the air storage tank 50 is filled. Therefore, a conventional air compressor of a rather small capacity can be used as the pressurized air source 134. That is, the air compressor only has to be of a capacity sufficient to supply air under pressure to the air storage tank when the pressure within the air storage tank 50 drops below the desired fixed level set by the pressure regulator 136 due to leakage of air from the air storage tank 50, the pneumatic cylinder 132, or the air passage between the source 134 and the pneumatic cylinder 132. The upward force exerted by the pneumatic cylinder 132 and applied to the portion 130 is produced by the pressure of the air within the air storage tank 50 as well as the pneumatic cylinder 132. Further, the pressure within the air storage tank 50 is constantly maintained at a desired fixed level for an extended period of time after the air storage tank 50 has once been filled. These facts also enable the use of a rather small compressor which needs less energy for operation.

It should further be understood that according to the pneumatic circuit arrangement of FIG. 3, the upward force applied to the body 130 can be maintained at a fixed value. The reason will be described hereinbelow. In accordance with the law of a absolute pressure systems, the following relationship given by equation (1) is established:

$$V_1(P+1.03) = (V_1+V_2)(P+1.03+\Delta P) \quad (1)$$

wherein $V_1(l)$ is the volume of the air storage tank 50 and the conduit 49 connecting the air storage tank 50 and the pneumatic cylinder 132, $V_2(l)$ is the increase in the volume of the pneumatic cylinder 132 due to the rise of the portion 130, $P(kg/cm^2 \cdot G)$ is the desired fixed pressure, set by the pressure regulator 136, of the pressurized air within the air storage tank 50, and $\Delta P(kg/cm^2 \cdot G)$ is the pressure increase of the pneumatic cylinder due to an increase in the volume of the pneumatic cylinder 132. From equation (1), the following equation (2) is established:

$$\Delta P = -V_2/V_1+V_2 \cdot (P+1.03) \quad (2)$$

It should be noted from equation (2), above, that the pressure increase $\Delta P$ becomes extremely small when $V_1$ is sufficiently greater than $V_2$. Therefore, the pressure within the pneumatic cylinder 132 is maintained at a substantially fixed level regardless of the increase in the volume of the pneumatic cylinder 132. When the volume of the chamber of the pneumatic cylinder 132 is reduced due to the downward movement of the portion 130, the increase in the pressure within the chamber remains very small, according to the principle explained above, since the chamber of the pneumatic cylinder 132 and the air storage tank 50 are directly connected by the conduit 49. As a result, the pressure of the air working within the pneumatic cylinder 132 is always maintained at a substantially fixed level.

Figure 4:
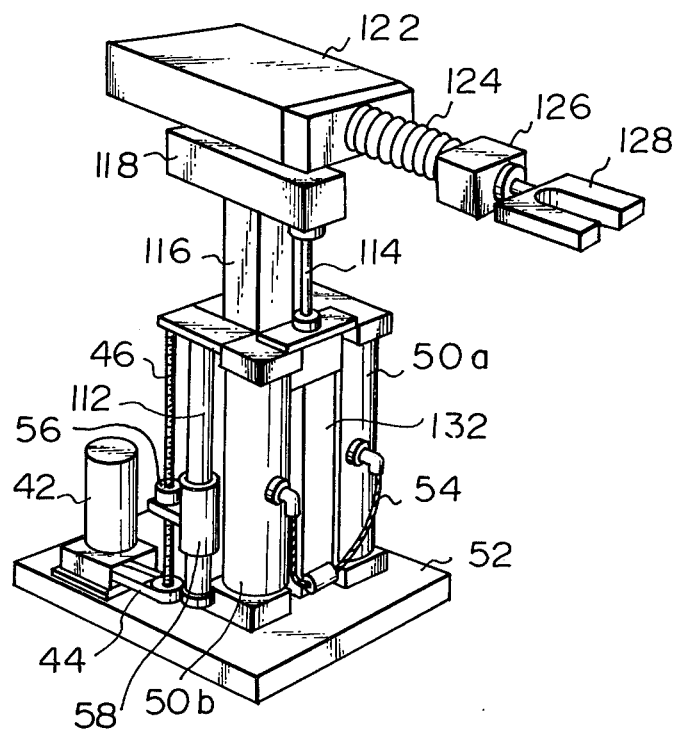
FIG. 4 is a perspective schematic view of an industrial robot equipped with a load reducing means according to the present invention.

Referring to FIG. 4, the vertically movable portion of the industrial robot comprises a robot rotation drive means 116, a bearing box 118, a robot housing 122, a robot arm 124, a robot wrist 126, and a robot hand 128. That is, as described later, the vertically movable portion is arranged to be vertically movable along a vertical guide pillar 112. It should be noted that the robot housing 122, is rotatable about a vertical axis by the operation of the drive means 116. A pneumatic cylinder 132 for applying an upward force to the vertically movable portion is fixedly mounted on a robot base 52, which is the lowermost element of the robot. The pneumatic cylinder 132 has the piston rod 114, of which the outermost end is connected to a part of the vertically movable portion. If required, it is possible to adopt an arrangement such that the outermost end of the piston rod 114 is fixed to the robot base 52 and the end of the pneumatic cylinder 132 is connected to the vertically movable portion. A vertical feed motor 42, a belt-and-pulley mechanism 44, and a feed screw 46 are also mounted on the robot base 52. That is, the feed screw 46 is rotated by the feed motor 42 by means of the belt-and-pulley mechanism 44. Since the feed screw 46 is threadedly engaged with a female screw element 56 provided at the vertically movable portion, the rotation of the feed screw 46 causes vertical movement of the vertically movable portion along the vertical guide pillar 112. Reference numeral 58 designates a slide provided for the vertically movable portion and slidably engaged with the vertical guide pillar 112. At this stage, a pair of vertical guide pillars may be substituted for the single pillar 112. In the embodiment of FIG. 4, a pair of air storage tanks 50a and 50b are disposed, which correspond to the air storage tank 50 of FIG. 3. These air storage tanks 50a and 50b are fixedly mounted on the robot base 52, and they are incorporated in the robot as a rigid structure to furnish the robot with mechanical rigidity and stability. Reference numeral 54 designates an air conduit means interconnecting both air storage tanks 50a and 50b and the pneumatic cylinder 132.

The use of the pair of air storage tanks 50a and 50b both for the air storage means and for the rigid structural means of the robot keeps to a minimum the increase in industrial robot dimensions as compared with conventional industrial robots, due to the additional air storage means and, conversely, ensures the rigidity of the industrial robot.

We claim:

1. An industrial robot comprising:
   a manipulative robot hand:
   a vertically movable body supporting said robot hand thereon:
   a vertical drive means for effecting vertical movement of the vertically movable portion of the robot guided by a vertical guide pillar or pillars, said vertical drive means including a vertical feed motor;
   a pneumatic cylinder means for applying an upward force to said vertically movable portion;
   air storage means arranged between a pressurized air source and said pneumatic cylinder means for storing air under pressure therein;
   a pressure regulator for regulating the pressure of said air supplied to said air storage means and a check valve arranged between said pressurized air source and said air storage means; and
   air conduit means for providing a direct connection between said air storage means and said pneumatic cylinder means.

2. An industrial robot as set forth in claim 1, wherein said air storage means comprises at least one rigid tank forming a rigid structure of said robot.

3. An industrial robot as set forth in claim 2, further comprising a robot base formed as a lowermost as set forth in claim 2, element for installing thereon said rigid structure and said vertical guide pillar or pillars.

* * * * *

UNITED STATES PATENT AND TRADEMARK OFFICE
CERTIFICATE OF CORRECTION

PATENT NO. : 4,465,424

DATED : August 14, 1984

INVENTOR(S) : Hajimu Inaba et al.

It is certified that error appears in the above-identified patent and that said Letters Patent is hereby corrected as shown below:

Column 6, lines 24 and 25 delete "as set forth in claim 2,".

Signed and Sealed this

Seventh Day of May 1985

[SEAL]

Attest:

DONALD J. QUIGG

Attesting Officer     Acting Commissioner of Patents and Trademarks